A. G. MARSDEN.
RESILIENT WHEEL.
APPLICATION FILED FEB. 15, 1917.
1,241,235. Patented Sept. 25, 1917.
2 SHEETS—SHEET 2.
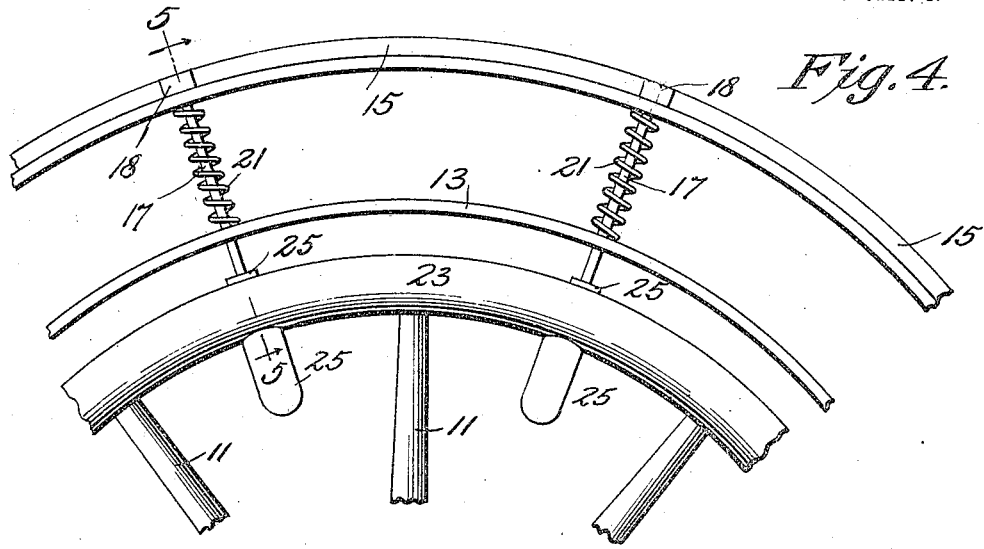
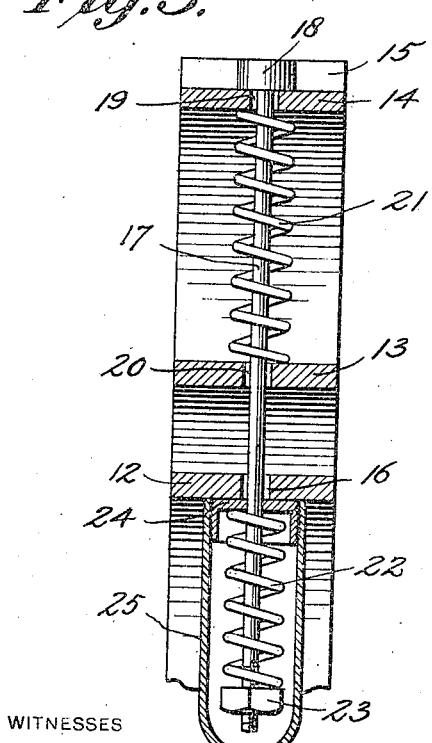
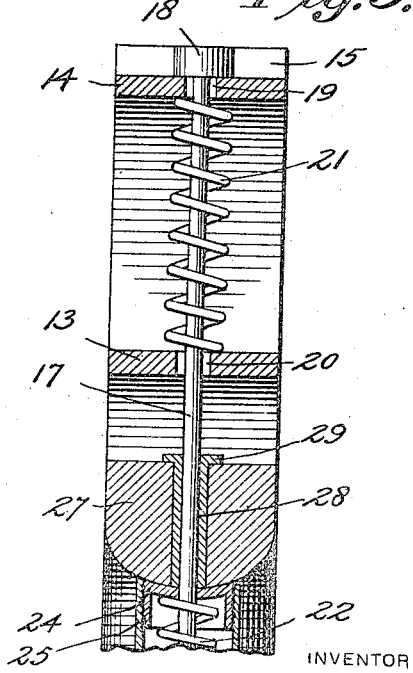
WITNESSES
INVENTOR
Arlow G. Marsden,
BY
ATTORNEY

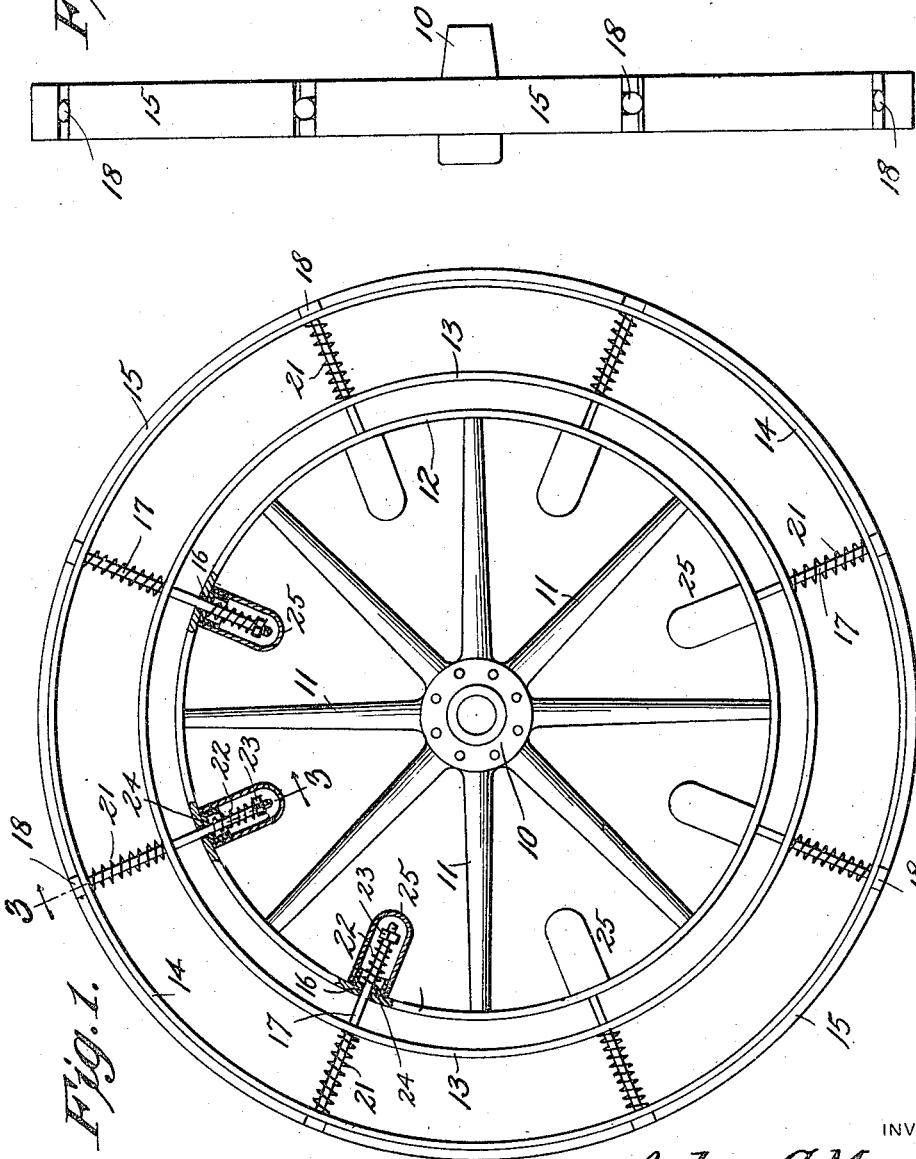

UNITED STATES PATENT OFFICE.

ARLOW G. MARSDEN, OF FORT ATKINSON, WISCONSIN.

RESILIENT WHEEL.

1,241,235.   Specification of Letters Patent.   Patented Sept. 25, 1917.

Application filed February 15, 1917. Serial No. 148,845.

*To all whom it may concern:*

Be it known that I, ARLOW G. MARSDEN, a citizen of the United States, residing at Fort Atkinson, in the county of Jefferson and State of Wisconsin, have invented certain new and useful Improvements in Resilient Wheels, of which the following is a specification.

This invention relates to resilient wheels for vehicles and has for its principal object the provision of a wheel having a resilient rim formed of few parts which are strong and securely connected together and which will yield to inequalities in the road and cause the body of the vehicle supported on said wheels to travel with great ease and comfort for the occupants.

With the above as the principal object in view the invention consists in the novel construction, combination, and arrangement of parts hereinafter described, pointed out in the appended claims and illustrated in the accompanying drawings, in which—

Figure 1 is a side elevation partly in section of the preferred form of the invention, Fig. 2 is an elevation of the wheel as seen from the right of Fig. 1, Fig. 3 is an enlarged cross sectional view on the line 3—3 of Fig. 1, Fig. 4 is a side elevation of a portion of a modified form of wheel, and Fig. 5 is a sectional view on the line 5—5 of Fig. 4.

In the drawings, 10 indicates the hub of a wheel from which radiate spokes 11, their outer ends being seated in and secured to a rim 12. The above parts are common in vehicle wheels and require no further description.

Encircling the rim 12 and spaced a short distance therefrom is a concentric rim 13 while a similar rim 14 encircles the rim 13 at a greater distance therefrom than the latter is spaced from the rim 12, and is covered on its outer surface by a strip of rubber or other resilient material 15. The rims 13 and 14 together form the resilient tire for the wheel. These two rims are maintained normally at the proper distance apart by resilient means and certain guiding bolts that permit deflection of the outer rim as the wheel travels over the ground. The inner rim 12 between each spoke 11 has a perforation 16 formed therein to receive freely the threaded end of a bolt 17, the outer end of which is provided with a circular head 18 that bears upon the exterior surface of the outer rim 14, passing through a perforation 19 in the outer rim and a like alined perforation 20 in the intermediate rim 13. Surrounding each bolt 17 between the outer rim 14 and the intermediate rim 13 is a coil spring 21, the ends of which bear against the respective rims. A like spring 22 encircles the inner end of each bolt and is held under adjustable tension by a nut 23 secured on the end of the bolt. The outer end of each spring 22 is seated in a shallow cup 24 pressed against the inner face of rim 12 by said spring. A cylindrical cap 25, closed at its outer end, is screwed on the cup 24, the exterior of which is suitably threaded, and protects the threaded end of bolt 24 from dust and dirt.

A wheel equipped with a tire such as described will, when in use and subjected to the weight of a load, tend to flatten the outer rim 14 on the bottom where it travels upon the ground, but owing to the resiliency of the rim itself which is preferably made of spring steel and the coil springs 21 and 22, this flattening is to a great extent prevented, and the rim will, immediately upon being relieved of weight, return to normal position and this constant yielding of the outer rim with the support of the coil springs will cause easy travel of a vehicle equipped with the present device.

Instead of using a metal inner rim 12, as in Figs. 1 to 3, this latter rim may be formed of wood as shown in Figs. 4 and 5 where the rim 27 is preferably fitted with metal sockets 28 extending radially through the rim to provide bearings for the bolts 17, thus eliminating wear due to the movement of the bolts through the rim 27. The sockets 28 as shown in Fig. 5 are preferably made of straight tubular members having a flange 29 on one end to bear against the outer periphery of the rim 27, the inner ends of said sockets terminating flush with the inner surface of the rim 27.

What I claim is:

1. A resilient tire for wheels comprising a pair of rims circumferentially disposed about the rim of a wheel and spaced therefrom, radial bolts extending through the tire and the wheel rim, a spring member surrounding each bolt between the aforesaid pair of rims, and a like spring around each bolt within the wheel rim.

2. A resilient tire for wheels comprising an outer rim and an intermediate concentric rim spaced apart and encircling the rim of a wheel at a short distance therefrom, radially disposed bolts slidably extending through the outer and intermediate rims of the tire and the rim of the wheel, a coil spring around each bolt between the outer and intermediate rims, a shallow cup slidable on each bolt, a spring on each bolt with one end in the cup and holding it against the rim of the wheel, and a nut adjustable on the end of each bolt and against the other end of the last named spring.

3. A resilient tire for wheels comprising an outer and an intermediate concentric rim spaced apart and encircling the rim of a wheel at a short distance therefrom, radially disposed bolts slidably extending through openings in said rims and projecting inwardly beyond the rim of the wheel, a coil spring around each bolt between the outer and the intermediate rims and a similar spring around the inner end of said bolt, a shallow cup slidable on the inner end of each bolt in which one end of the latter spring is seated and by means of which the cup is maintained in contact with the rim of the wheel, a nut on each bolt pressing upon the inner spring and adapted to adjust the tension thereof, and a cap extending over the inner end of each of said bolts and the springs surrounding the same, and threaded upon the shallow cup and movable longitudinally therewith.

In testimony whereof I affix my signature in presence of two witnesses.

ARLOW G. MARSDEN.

Witnesses:
CHARLES B. ROGERS,
MARIE CORNISH.

Copies of this patent may be obtained for five cents each, by addressing the "Commissioner of Patents, Washington, D. C."